United States Patent [19]

Roley

[11] 4,392,657
[45] Jul. 12, 1983

[54] BELLEVILLE SPRING LOADED SEAL

[75] Inventor: Robert D. Roley, Peoria, Ill.

[73] Assignee: Caterpillar Tractor Co., Peoria, Ill.

[21] Appl. No.: 151,841

[22] PCT Filed: Feb. 19, 1980

[86] PCT No.: PCT/US80/00164
§ 371 Date: Feb. 19, 1980
§ 102(e) Date: Feb. 19, 1980

[87] PCT Pub. No.: WO81/02455
PCT Pub. Date: Sep. 3, 1981

[51] Int. Cl.³ .................. F16J 15/32; F16J 15/34
[52] U.S. Cl. .................. 277/95; 277/152; 277/166; 277/186; 305/11
[58] Field of Search .................. 277/38-43, 277/81 R, 84, 92, 95, 152, 153, 165, 166, 181, 186; 305/11-13

[56] References Cited

U.S. PATENT DOCUMENTS

| | | | |
|---|---|---|---|
| 2,330,104 | 9/1943 | Antonelli | 277/153 |
| 2,736,584 | 2/1956 | Riesing | 277/153 |
| 2,736,585 | 2/1956 | Riesing | 277/223 X |
| 2,938,744 | 5/1960 | Fritch | 277/95 X |
| 3,197,217 | 7/1965 | Mastrobattista et al. | 277/153 |
| 3,370,895 | 2/1968 | Cason | 277/88 X |
| 3,390,922 | 7/1968 | Reinsma | 305/11 |
| 3,614,113 | 10/1971 | Burk | 277/94 |
| 3,841,718 | 10/1974 | Reinsman | 305/11 |
| 4,132,418 | 1/1979 | Roli | 277/95 X |
| 4,179,130 | 12/1979 | Fass et al. | 277/92 X |

FOREIGN PATENT DOCUMENTS

| | | | |
|---|---|---|---|
| 832368 | 2/1952 | Fed. Rep. of Germany | 277/153 |
| 837814 | 6/1960 | United Kingdom | 277/95 |

Primary Examiner—Robert S. Ward, Jr.
Attorney, Agent, or Firm—Wood, Dalton, Phillips, Mason, & Rowe

[57] ABSTRACT

Sealing structure (10,110) for a sealing a first joint member (11,111) to a second joint member (12,112) across a variable space therebetween. The sealing structure includes a frustoconical Belleville spring (17,117) and an annular support spring (18,118) defining an arcuate cross section having one end (19,119) connected to the Belleville spring, and an opposite end (20,120) sealingly mounted to the first joint member (11,111). A seal element (21,121) is fixed to the Belleville spring and has a lip portion (22,122) projecting into dynamic sealing engagement with the second joint member (12).

16 Claims, 5 Drawing Figures

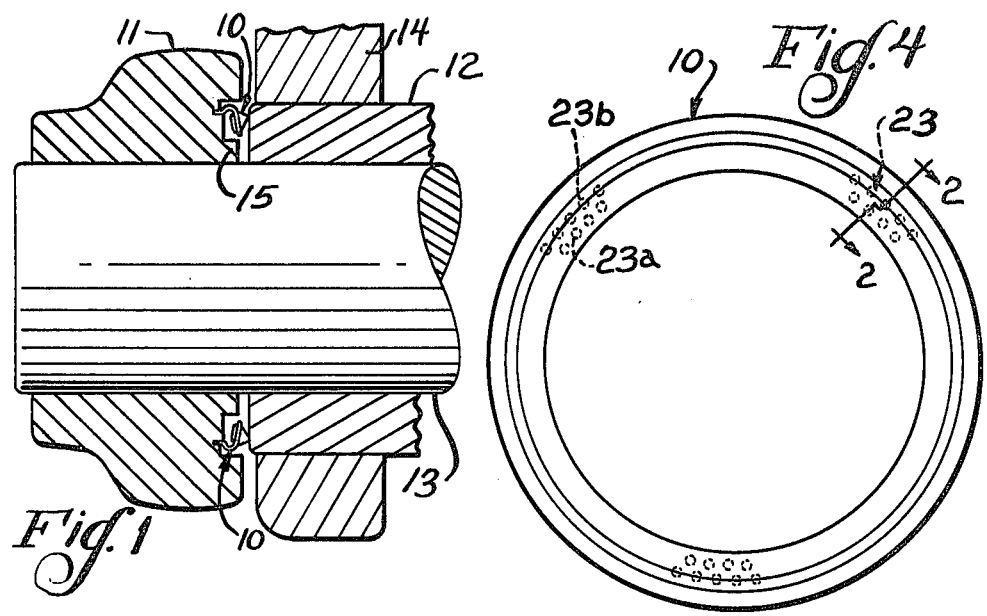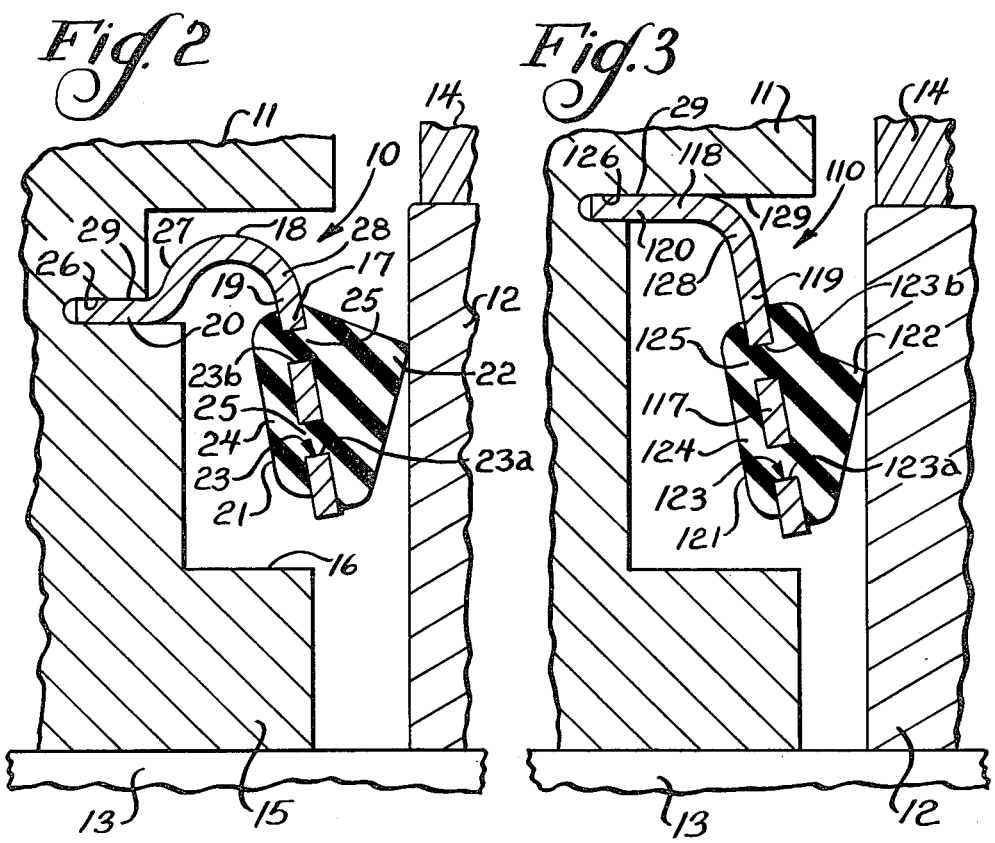

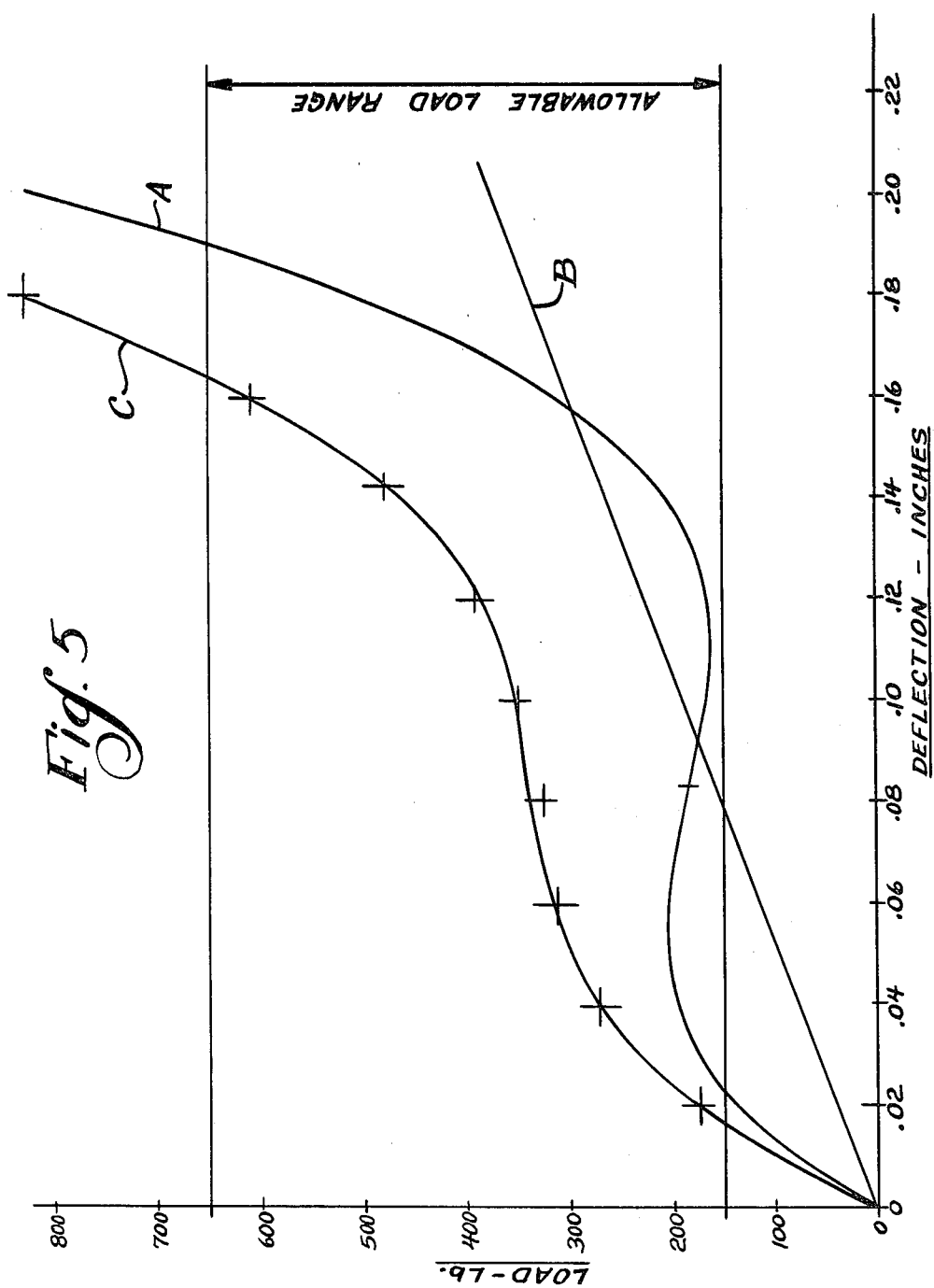

BELLEVILLE SPRING LOADED SEAL

DESCRIPTION

1. Technical Field

This invention relates to joints having relatively movable members, and more particularly to means for sealing the joints between the relatively movable members.

2. Background Art

A large number of different seals have been developed for use in sealing a space between two members which may have relative movement toward and from each other. One joint in which such movement occurs and sealing of the space between the members is desirable is that found in the track structure of a track-type vehicle, such as a tractor or the like. Examples of improved seals for use in such track joints are illustrated in U.S. Pat. No. 3,614,113 of Duane L. Burke and U.S. Pat. No. 3,841,718 of Harold L. Reinsma, each of which patents is owned by the assignee hereof.

More specifically, as shown in U.S. Pat. No. 3,614,113, a seal is provided including a resilient annular boot embracing the outer diameter of a pair of frustoconical Belleville springs. The springs are positioned back to back and the seal is positioned in an annular recess formed in one of the relatively movable joint members. The Belleville springs bias spaced portions of the boot into sealing engagement with confronting surfaces of the relatively movable joint members.

In U.S. Pat. No. 3,841,718, a crescent seal ring is provided in the recess and a load ring is received within the crescent ring to load the crescent ring and urge the spaced portions thereof sealingly against the confronting surfaces of the relatively movable joint members. The seal ring is provided with a thin flexible hinge section so as to permit the deflection of the seal ring into sealing engagement with the confronting joint member surfaces to be effected primarily by the compression of the load ring.

As discussed in the Reinsma U.S. Pat. No. 3,841,718, the structure thereof comprises an improvement over the seal structure of the earlier U.S. Pat. No. 3,390,922 of that patentee. In the earlier U.S. Pat. No. 3,390,922, the sealing force of the seal ring against the confronting surfaces of the joint members was derived substantially fully from the deflection of the thick seal ring itself and the load ring was of relatively soft material so as to act primarily as a filler or auxiliary static seal.

DISCLOSURE OF INVENTION

The present invention comprehends an improved joint seal received in the space between relatively movable first and second joint members including a frustoconical Belleville spring, an annular support spring defining an arcuate cross section having one end connected to an outer portion of the Belleville spring, and an opposite end sealingly mounted to the first member, and a seal element fixed to the Belleville spring and having a lip portion projecting into dynamic sealing engagement with the second member.

In the illustrated embodiment, the spring constants of the Belleville and support springs are preselected to cumulatively cause the sealing force developed thereby in the seal element to continuously increase with an increase in deflection over the range of variable spacing between the joint members.

In the illustrated embodiment, the spring constant of the support spring is substantially a constant over the range of variable spacing between the members. In the illustrated embodiment, the Belleville springs may pass over center in the range of variable spacing between the members.

In the illustrated embodiment, the support springs are formed unitarily integrally with the Belleville springs.

In the illustrated embodiment, the Belleville springs define a plurality of through openings and the seal elements extend through the openings so as to secure the seal elements to the Belleville springs.

In the illustrated embodiment, the seal elements comprise a body of synthetic resin set in situ about the Belleville springs.

Broadly, the invention comprehends the provision of a seal including a frustoconical Belleville spring having a plurality of through openings and a body of elastic synthetic resins set in situ on the spring and having a lip portion, a retaining portion, and a connecting portion extending through the openings to retain the lip portion fixedly secured to the spring.

In the illustrated embodiments, the opposite end portion of the annular support springs is received in a recess in the first joint member and defines a static seal therebetween.

In the illustrated embodiment, the opposite end portion of the support spring comprises a right circularly cylindrical portion.

In one form the arcuate cross section of the support spring extends less than 90° in its free state, and in another illustrated form, the arcuate cross section extends more than 90°.

In one form, the end portion of the support spring is received substantially fully within the recess, and in another form, is received only partially therein.

Thus, the joint seal of the present invention is extremely simple and economical of construction while yet providing the highly desirable features discussed above.

BRIEF DESCRIPTION OF THE DRAWING

FIG. 1 is a fragmentary diametric section of a track pin joint having an improved seal embodying the invention;

FIG. 2 is a fragmentary enlarged section taken substantially along the line 2—2 of FIG. 4;

FIG. 3 is a view similar to that of FIG. 2 but illustrating a modified form of seal embodying the invention;

FIG. 4 is an end view of the seal of FIG. 1; and

FIG. 5 is a graph illustrating the load deflection characteristics of the seal of FIG. 2.

BEST MODE FOR CARRYING OUT THE INVENTION

In the illustrative embodiment of the invention as shown in FIGS. 1, 2, 4 and 5 of the drawing, a sealing structure generally designated 10 is illustrated for use in sealing the space between the first joint member 11 and a second joint member 12 which may have relative movement toward and from each other so as to have variable spacing therebetween. In the illustrated embodiment, member 11 comprises a portion of a first track link, member 12 comprises a bushing mounting a track pin 13 and receiving a portion of a second track line 14. Movement of members 11 and 12 toward each other may be limited by a thrust collar 15 formed integrally with link member 11, as shown in FIG. 1.

First member 11 further defines a recess 16 opening toward second member 12 and receiving the sealing structure 10, as best seen in FIG. 2. The sealing structure includes a frustoconical ring defining a Belleville spring 17, an annular support spring 18 defining an arcuate cross section and having one end 19 connected to an outer portion of the Belleville spring 17, and an opposite end 20 sealingly mounted to the first joint member 11.

A seal element 21 is fixedly mounted to the Belleville spring 17 and includes a lip portion 22 projecting into dynamic sealing engagement with the second joint member 12, as shown in FIG. 2.

Belleville spring 17 may be provided with one or more through openings 23. As shown in FIG. 4, the seal element comprises an annular element with one portion 23a of the opening defining a radially inner annular series and a second portion 23b of the openings defining a radially outer annular series offset of the inner series by one-half the spacing therebetween.

As illustrated in FIG. 2, seal element 21 includes in addition to lip portion 22, a retaining portion 24, and connecting portions 25 extending through the Belleville spring openings 23. In the illustrated embodiment, the openings 23 are equiangularly spaced about the axis of the seal ring and thus the seal element 21 is uniformly supported throughout its annular extent on the Belleville spring.

In the illustrated embodiment, seal element 21 is formed of a synthetic resin which may be molded in situ onto the Belleville spring. Illustratively, the seal element may be formed of polyurethane so as to provide excellent sealing characteristics.

As further illustrated in FIG. 2, support spring end 20 may be received in a recess 26 in link member 11 opened toward the seal receiving recess 16. Spring end 20 may be suitably sealed in recess 26 to provide a positive static seal therewith.

Referring now more specifically to FIGS. 2 and 5, it may be seen that the seal element lip portion 22 is urged sealingly against joint member 12 by the springy action of both the Belleville spring 17 and the support spring 18. As shown by curve A in FIG. 5, the loading of the sealing lip follows a typical Belleville spring loading as the spacing between members 11 and 12 decreases, i.e. effects a deflection of the Belleville spring. As shown in FIG. 5, the Belleville spring curve includes a reverse portion so that as the deflection increases from zero deflection, the load at first increases and then reaches a first peak followed by a decrease in the loading for a substantial further amount of deflection. The load then again increases with further deflection.

Curve B of FIG. 5 illustrates the conventional load curve for an arcuate spring, such as arcuate spring 18. As shown, such a spring has a constant load-to-deflection characteristic. The combination of the two load characteristics results in curve C which, as shown in FIG. 5, provides a relatively high safety factor by bringing the load characteristics up to a substantially higher load range than that obtained by the use of a Belleville spring alone illustrated by Curve A, or an arcuate spring alone illustrated by Curve B.

As shown in FIG. 5, the Belleville spring 17 is arranged to pass over center in the range of movement between the members 11 and 12 so as to obtain a greater range of load deflection.

Support spring 18 includes an outturned arcuate portion 27 and an inturned arcuate portion 28. Referring now more specifically to the embodiment of FIG. 3, a modified form of sealing structure generally designated 110 is shown to comprise a sealing structure generally similar to sealing structure 10 but wherein the arcuate portion 118 of the support spring includes only an inturned portion 128, the end 120 extending from the outermost portion of the arcuate spring portion 118 into the recess 126. As shown in each of FIGS. 2 and 3, the spring end portions 20 and 120 define right circularly cylindrical end portions received in corresponding right circularly cylindrical recesses 26 and 126, respectively.

Sealing structure 110 further distinguishes from sealing structure 10 in that the support spring end 120 projects outwardly from the recess 126, whereas in sealing structure 10, the spring end portion 20 is received substantially fully within the recess 26. However, as seen in FIG. 3, link member 11 defines a radially inwardly facing surface 129 against which the spring end 120 facially abuts so as to radially outwardly support the spring end 120 outwardly of recess 126.

As further illustrated in FIG. 3, the sealing element 121 may have a somewhat shortened axial extent as compared to that of the sealing element 21 illustrated in FIG. 2. However, sealing structure 110 is generally similar to and functions generally similar to sealing structure 10 and provides a load curve generally similar to load curve C of FIG. 5 in combining the desirable spring characteristics of both the Belleville spring portion and the arcuate support spring portion of the sealing structure.

In each of the illustrated embodiments, the support spring extends unitarily integrally from the Belleville spring. Thus, the joint spring structure may be formed as a single stamping from suitable spring sheet material.

The forming of the seal element in situ about the Belleville spring in each of the embodiments permits the seal element to be secured to the Belleville spring not only by its mechanical hold thereon, but also by the adhesive-type bonding effected by setting of the synthetic resin in contact with the spring surfaces.

Industrial Applicability

The improved sealing structures 10 and 110 of the present invention provide an improved sealing of variably spaced joint members such as in the illustrated track joint disclosed above. The use of the coacting Belleville spring and arcuate support spring portions of the seal element support provides an improved deflection curve assuring positive sealing of the seal element lip portion with the confronting surface of the joint member 12 over the entire range of variable spacing between the joint members.

The sealing structures provide all of the beneficial features of the Belleville-loaded seal structures while being relatively simple and economical of construction. As a result, the seal size may be relatively small while yet providing a positive dynamic seal between the seal element and the joint member 12. By virtue of the reduction in the overall size of the sealing structure, the recess 16 may be made relatively small so as to facilitate machining and minimize cost thereof.

The static seal of the spring end 20 and 120 to the joint members 11 and 11 may be effected by means of suitable sealant material 29 to further assure a positive static seal between the sealing structure and the joint member to which it is mounted. The static seal effectively prevents passage of dirt behind the seal which provides an improved sealing functioning in dirty environments, such as those in which joint structures such as the illustrative tractor track joint may be used.

By forming the two springs integrally, a simple low cost spring support for the seal element is provided having the highly desirable loading characteristics discussed above providing improved long life, low maintenance functioning of the sealing structures.

Other aspects, objects and advantages of this invention can be obtained from a study of the drawings, the disclosure and the appended claims. The foregoing disclosure of specific embodiments is illustrative of the broad inventive concepts comprehended by the invention.

I claim:

1. In a joint having a first member (11,111) and a second member (12) variably spaced adjacent said first member, an improved sealing structure (10,110) for sealing said first member to said second member across the movable space therebetween, said sealing structure comprising:

a frustoconical Belleville spring (17,117);

an annular support spring (18,118) defining an arcuate cross section having an end (19,119) connected to an outer portion of the Belleville spring and an opposite end (20,120) sealingly mounted to said first member (11,111), the spring constants of said Belleville (17,117) and support springs (18,118) being preselected to cumulatively cause a biasing sealing force developed thereby to continuously increase with an increase in deflection of said springs over the range of variable spacing between said members (11,111,12) notwithstanding a decrease in the sealing force developed by the Belleville spring alone over a portion of the range of increasing deflection; and a seal element (21,121) fixed to said Belleville spring and having a lip portion (22,122) urged into dynamic sealing engagement with said second member (12) by said cumulative continuously increasing biasing action of said spring.

2. The joint of claim 1 wherein the spring constant of said support spring (18,118) is substantially a constant over said range of variable spacing between said members.

3. The joint of claim 1 wherein said Belleville spring (17,117) passes over center in the range of variable spacing between said members.

4. The joint of claim 1 wherein said support spring (18,118) is formed unitarily integrally with said Belleville spring.

5. The joint of claim 1 wherein said Belleville spring (17,117) defines a plurality of through openings (23,123) and said seal element (21,121) extends through said openings.

6. The joint of claim 1 wherein said seal element (21,121) comprises a body of synthetic resin set in situ about said Belleview spring (17,117).

7. In a sealing structure (10,110) comprising:

an apertured frustoconical Belleville spring (17,117) having a plurality of through openings (23,123);

a body (21,121) of elastic synthetic resin set in situ on said spring (17,117) and having a lip portion (22,122), a retaining portion (24,124), and a connecting portion (25,125) extending through said openings to retain said lip portion fixedly secured to said spring; and means for causing the load deflection characteristics of the sealing structure to provide a continuously increasing sealing force to be provided in said body notwithstanding a decrease in the sealing force produced by the apertured Belleville spring over a range of increasing deflection of the Belleville spring.

8. The seal of claim 7 wherein said openings (23,123) are spaced equiangularly about the axis of the spring.

9. The seal of claim 7 wherein said openings define a first, radially inner plurality of openings (23a,123a) spaced about the axis of the spring, and a second, radially outer plurality of openings (23b,123b) spaced about the axis of the spring.

10. The seal of claim 7 wherein said openings define a first, radially inner plurality of openings (23a,123a) spaced about the axis of the spring, and a second, radially outer plurality of openings (23b,123b) spaced about the axis of the spring and offset angularly relative to said inner openings (23a,123a).

11. In a joint having a first member (11,111) provided with a recess (26,126) and a second member (12) variably spaced adjacent said first member, an improved sealing structure (10,110) for sealing said first member to said second member across the movable space therebetween, said sealing structure comprising:

a frustoconical Belleville spring (17,117);

an annular support spring (18,118) defining an arcuate cross section having one end (19,119) connected to an outer portion of the Belleville spring and an opposite end (20,120) sealingly mounted to said first member (11,111) in said recess (26,126), the spring constants of said Belleville (17,117) and support springs (18,118) being preselected to cumulatively cause a biasing sealing force developed thereby to continuously increase with an increase in deflection of said springs over the range of variable spacing between said members (11,111,12) notwithstanding a decrease in the sealing force developed by the Belleville spring alone over a portion of the range of increasing deflection; and a seal element (21,121) sealingly mounted to said Belleville spring and having a lip portion (22,122) urged into dynamic sealing engagement with said second member (12) by said cumulative continuously increasing biasing action of said spring.

12. The joint of claim 11 wherein said opposite end (20,120) comprises a right circularly cylindrical portion.

13. The joint of claim 11 wherein said arcuate cross section (118) extends less than 90° in its free state.

14. The joint of claim 11 wherein said arcuate cross section (18) extends more than 90° in its free state and includes a first portion (27) joined to the portion in said recess extending arcuately away from the axis of the cross section (18), and a second portion (28) joined to said Belleville spring (17) extending arcuately toward the axis of the spring cross section (18).

15. The joint of claim 11 wherein said opposite end (20,120) comprises a right circularly cylindrical portion received substantially fully within said recess (26).

16. The joint of claim 11 wherein said opposite end (20,120) comprises a right circularly cylindrical portion having only a distal portion thereof received in said recess (126).

* * * * *